US008578309B2

(12) United States Patent
Mehta et al.

(10) Patent No.: US 8,578,309 B2
(45) Date of Patent: Nov. 5, 2013

(54) FORMAT CONVERSION FROM VALUE CHANGE DUMP (VCD) TO UNIVERSAL VERIFICATION METHODOLOGY (UVM)

(75) Inventors: Ashok Mehta, Los Gatos, CA (US); Stanley John, Fremont, CA (US); Sandeep Kumar Goel, San Jose, CA (US); Kai-Yuan Ting, San Jose, CA (US)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 13/362,415

(22) Filed: Jan. 31, 2012

(65) Prior Publication Data

US 2013/0198706 A1 Aug. 1, 2013

(51) Int. Cl.
G06F 17/50 (2006.01)
(52) U.S. Cl.
USPC ........... 716/106; 716/111; 716/112; 716/136; 716/138; 703/13; 703/14
(58) Field of Classification Search
USPC ............. 716/106, 111, 112, 136, 138; 703/13
See application file for complete search history.

(56) References Cited

U.S. PATENT DOCUMENTS

| 5,477,138 | A  | * | 12/1995 | Erjavic et al. | 324/762.02 |
|---|---|---|---|---|---|
| 6,671,874 | B1 | * | 12/2003 | Passova | 717/126 |
| 7,047,239 | B2 | * | 5/2006 | French et al. | 1/1 |
| 7,133,548 | B2 | * | 11/2006 | Kenan et al. | 382/144 |
| 7,185,295 | B2 | * | 2/2007 | Park et al. | 716/136 |
| 7,415,400 | B2 | * | 8/2008 | Zhu et al. | 703/7 |
| 7,422,930 | B2 | * | 9/2008 | Thomas et al. | 438/109 |
| 7,571,400 | B2 | * | 8/2009 | Park et al. | 716/136 |
| 7,702,499 | B1 | * | 4/2010 | Lavagno et al. | 703/27 |
| 7,948,071 | B2 | * | 5/2011 | Thomas et al. | 257/686 |
| 8,055,966 | B1 | * | 11/2011 | Sogani | 714/733 |
| 8,290,761 | B1 | * | 10/2012 | Singhee et al. | 703/14 |
| 8,312,404 | B2 | * | 11/2012 | Hu et al. | 716/115 |
| 2005/0149310 | A1 | * | 7/2005 | Huang et al. | 703/14 |
| 2010/0082315 | A1 | * | 4/2010 | Hall | 703/13 |
| 2011/0238397 | A1 | * | 9/2011 | Chen et al. | 703/13 |
| 2012/0227021 | A1 | * | 9/2012 | Huilgol | 716/106 |
| 2013/0007549 | A1 | * | 1/2013 | Chan | 714/741 |

OTHER PUBLICATIONS

Accellera; "How to use the Universal Verification Methodology (UVM) for creating SystemVerilog testbenches"; May 18, 2011; Universal Verification Methodology (UVM) 1.1 Users Guide—Accellerawww.accellera.org/downloads/standards/.../uvm_users_guide_1.1.pdf.*

Accellera—Universal Verification Methodology (UVM) 1.1 Class Reference, Jun. 2011, 852 pages.

* cited by examiner

*Primary Examiner* — Helen Rossoshek
(74) *Attorney, Agent, or Firm* — Duane Morris LLP; Steven E. Koffs

(57) ABSTRACT

A system and method is disclosed for functional verification and/or simulation of dies in a multi-die 3D ICs. The system and method include converting an I/O trace, embodied as a Value Change Dump, to one or more Universal Verification Methodology objects. This conversion aids in identify and fixing issues contained in die.

19 Claims, 10 Drawing Sheets

US 8,578,309 B2

FORMAT CONVERSION FROM VALUE CHANGE DUMP (VCD) TO UNIVERSAL VERIFICATION METHODOLOGY (UVM)

BACKGROUND

Package architecture is moving beyond the traditional uniplanar arrangement of a single integrated circuit (IC) chip. Three-dimensional ("3D") architectures are generating greater interest and offer many advantages over uniplanar architectures. 3D architectures or 3D chip stacks (sometimes referred to herein as "3D stack", "3D IC", "stack of dies") encompass architectures where chips are positioned on more than one plane and may be integrated both horizontally and vertically into a single package. Nevertheless, 3D ICs present a variety of challenges for verifying the functionality of the individual chips in the circuit. Verification of connections between chips in a 3D IC may be labor and resource-intensive and involve long testing and verification times.

A typical current 3D IC verification methodology system is shown as system 100 in FIG. 1. Four individual dies, Die A 102, Die B 103, Die C 104, and Die D 105 are stacked in a 3D IC stack operatively connected to a test bench 101 such that only Die A is directly connected to the test bench and each of the other dies in the stack, which are separated by inter-die interfaces 107, 108, and 109, are not directly connected to the test bench. Peripheral drivers 106 are also attached to the test bench 101. The interactions between Dies A through D are shown by arrows 1A, 1B, 1C, 1D, 2B, 2C, 2D, 3C, 3D, and 4D. In order to perform functional verification of Die A 102 using the test bench 101 and the peripheral drivers 106, the interactions between all of the dies in the stack are taken into account.

DETAILED DESCRIPTION

With reference to the figures where like elements have been given like numerical designations to facilitate an understanding of the present subject matter, the various embodiments of a system and method for functional verification of multi-die 3D ICs are described.

Embodiments of the present subject matter overcome the challenges associated with functional verification methods for 3D ICs and avoid the penalties that are paid when using traditional functional verification methods that are uncontrollable, unobservable, time consuming, labor-intensive, complex, and involve an inordinate amount of resources. The present subject matter allows for incremental reuse of a die verification environment for any number of dies in a 3D stack of dies. Furthermore, embodiments of the present subject matter have the advantage that Universal Verification Methodology ("UVM") transactions allow for a clear view of functional activity at the die boundary, are easy to debug, and permit a test operator increased ability to control and/or change UVM transactions as desired. These advantages result in minimizing overall simulation and/or verification time, debugging time, and overall development time thereby providing for a shorter time to market with the attendant economic advantages.

In some embodiments, described in further detail below, a method for verifying a functionality of dies arranged in a stack of dies comprises running a simulation on a first die in the stack; generating an I/O trace from the simulation run on the first die; converting the I/O trace to at least one transaction level object; and converting the transaction level object to a signal level object, wherein the signal level object is used to run a second simulation on a second die in the stack. In an embodiment, the I/O trace may be a VCD, and the transaction level object may be a UVM transaction. The UVM transaction may be used to create UVM sequence objects, which are then used to drive the second simulation on the second die. These sequence objects may be directed, constrained, directed and constrained, or random.

In still another embodiment, described in detail below, a system architecture for verifying a functionality of dies arranged in a stack of dies comprises a memory device and a processor, wherein the processor is configured to run a simulation on a first die in the stack; store an I/O trace generated by the simulation in the memory device; establish a UVM environment for testing a second die in the stack; convert the I/O trace to a UVM transaction; and run a second simulation on the second die. The UVM environment may comprise an agent and a comparator, wherein the agent includes a device driver and an output monitor. The comparator may be further configured to compare an actual output of the second simulation to an expected out generated from the I/O trace; identify discrepancies between the actual output and the expected output; and store those discrepancies in a log.

Figure 2:
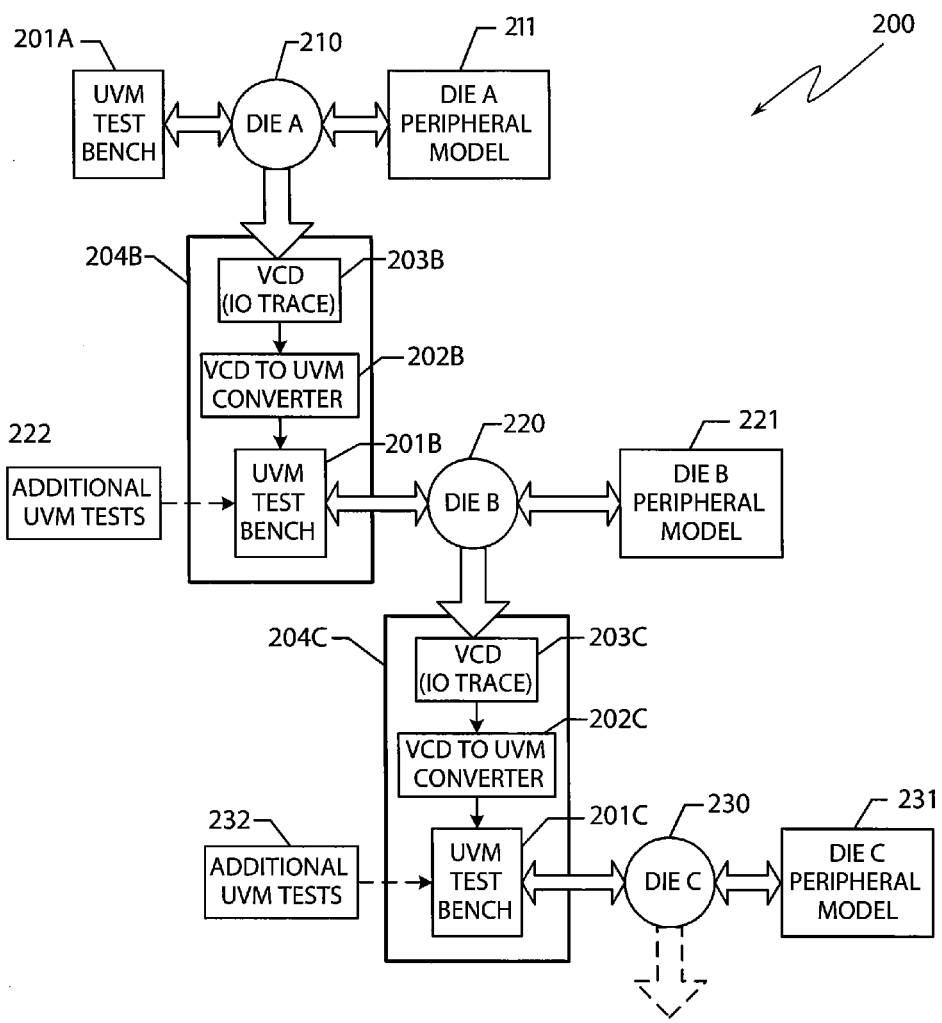
FIG. 2 is a simplified schematic diagram of a 3D IC verification methodology system according to an embodiment of the present subject matter.

With attention now directed at FIG. 2, a simplified schematic diagram of a 3D IC verification methodology system 200 according to an embodiment of the present subject matter is presented. In some embodiments, the system 200 is used to individually verify the functionality of the dies in a stack of dies such as a 3-dimensional stack. In some embodiments, Die A 210, which is in the stack of dies, is operatively connected to a test bench 201A, which is a UVM test bench, and Die A is also operatively connected to a peripheral model 211 for Die A. A functionality verification test or simulation is run on Die A using the test bench and the Die A peripheral model. The functional verification test of Die A produces a first I/O trace in a first format which is sent to memory device 203B. The first format may be a signal level format and such as a Value Change Dump ("VCD") format. The first I/O trace in the first format is sent to converter 202B to change the first I/O trace in the first format to a first I/O trace in a second format.

Alternatively, the first I/O trace in the first format is sent directly to the converter 202B without being sent to memory device 203B. The second format may be a transaction level format and such as a Universal Verification Methodology ("UVM") format. In some embodiments, the converter 202B is a VCD to UVM converter. The first I/O trace in the second format is applied to the test bench 201B, which is may be the same test bench as test bench 201A, for verifying the functionality of Die B 220, as described below. Together, the memory device 203B, the converter 202B, and the test bench 201B comprise a verification environment 204B which can be reused for verifying other dies in the stack of dies as discussed in further detail below.

For verifying the functionality of Die B 220, where test bench 201A and 201B are the same, Die A 210 will have been disconnected from the test bench and Die B operatively connected in its place. Die B 220 is also operatively connected to Die B peripheral model 221. A functional verification test may now be run on Die B using the first I/O trace in the second format which is applied to the test bench 201B as discussed above. In an alternative embodiment for verifying the functionality of Die B, additional test input, such as UVM formatted input, may be applied by device/circuitry 222 to the test bench 201B in addition to the first I/O trace in the second format being applied to the test bench.

In a further embodiment, the functional verification test or simulation of Die B 220 produces a second I/O trace in the first format which is sent to memory device 203C. The first format may be a signal level format, such as VCD format. Together, the memory device 203C, the converter 202C, and the test bench 201C comprise a verification environment 204C which may be the same as verification environment 204B, discussed above. The second I/O trace in the first format is sent from memory device 203C to converter 202C to change the second I/O trace in the first format to a second I/O trace in the second format. Alternatively, the second I/O trace in the first format is sent directly to the converter 202C without being sent to memory device 203C. The second format may be a transaction level format, such as UVM format. In an embodiment, the converter 202C is a VCD to UVM converter. The second I/O trace in the second format is applied to the test bench 201C, which is may be the same test bench as test bench 201B and test bench 201A, for verifying the functionality of Die C 230, as described below.

For verifying the functionality of Die C 230, where test bench 201C, and 201B are the same, Die B 220 will have been disconnected from the test bench and Die C operatively connected in its place. Die C 230 is also operatively connected to Die C peripheral model 231. A functional verification test or simulation may now be run on Die C using the second I/O trace in the second format which is applied to the test bench 201C as discussed above. In an alternative embodiment for verifying the functionality of Die C, additional test input in UVM format may be applied by device/circuitry 232 to the test bench 201C in addition to the second I/O trace in the second format being applied to the test bench.

The functional verification test of Die C 230 produces a third I/O trace in the first format which can be applied to an additional verification environment (not shown) for performing functional verification tests of further dies in the stack of dies. Thus, the system 200 allows reuse of a verification environment, as described above, for functionality verification testing of further dies in a stack of dies. Each die being tested does not require the simultaneous operation of any other die in the stack. Furthermore, each subsequent die tested by the system 200 uses as an input an I/O trace produced at least in part from the testing of all previously-tested dies in the stack.

Figure 1:
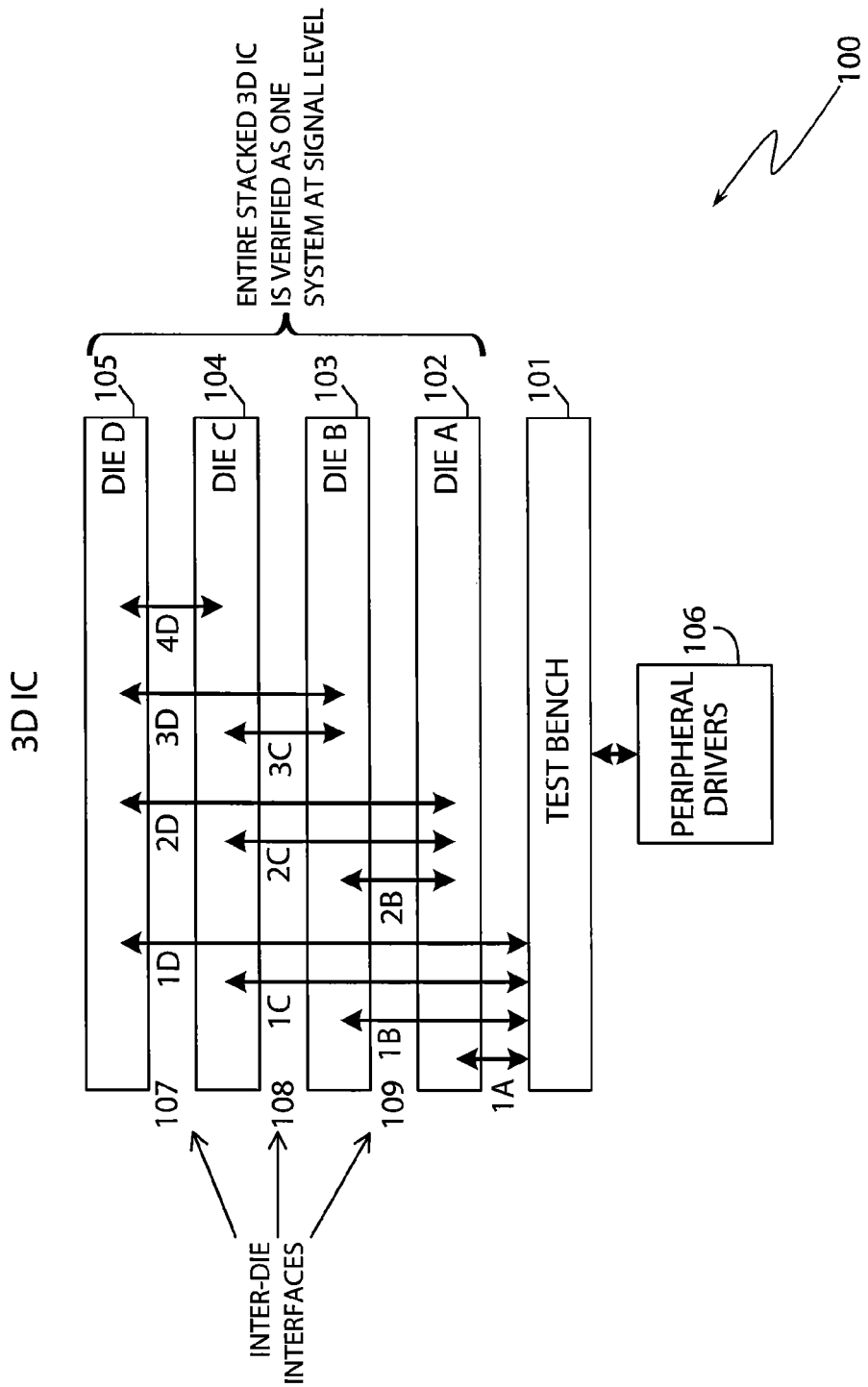
FIG. 1 is a simplified schematic diagram of a prior art 3D IC verification methodology system.
Figure 3:
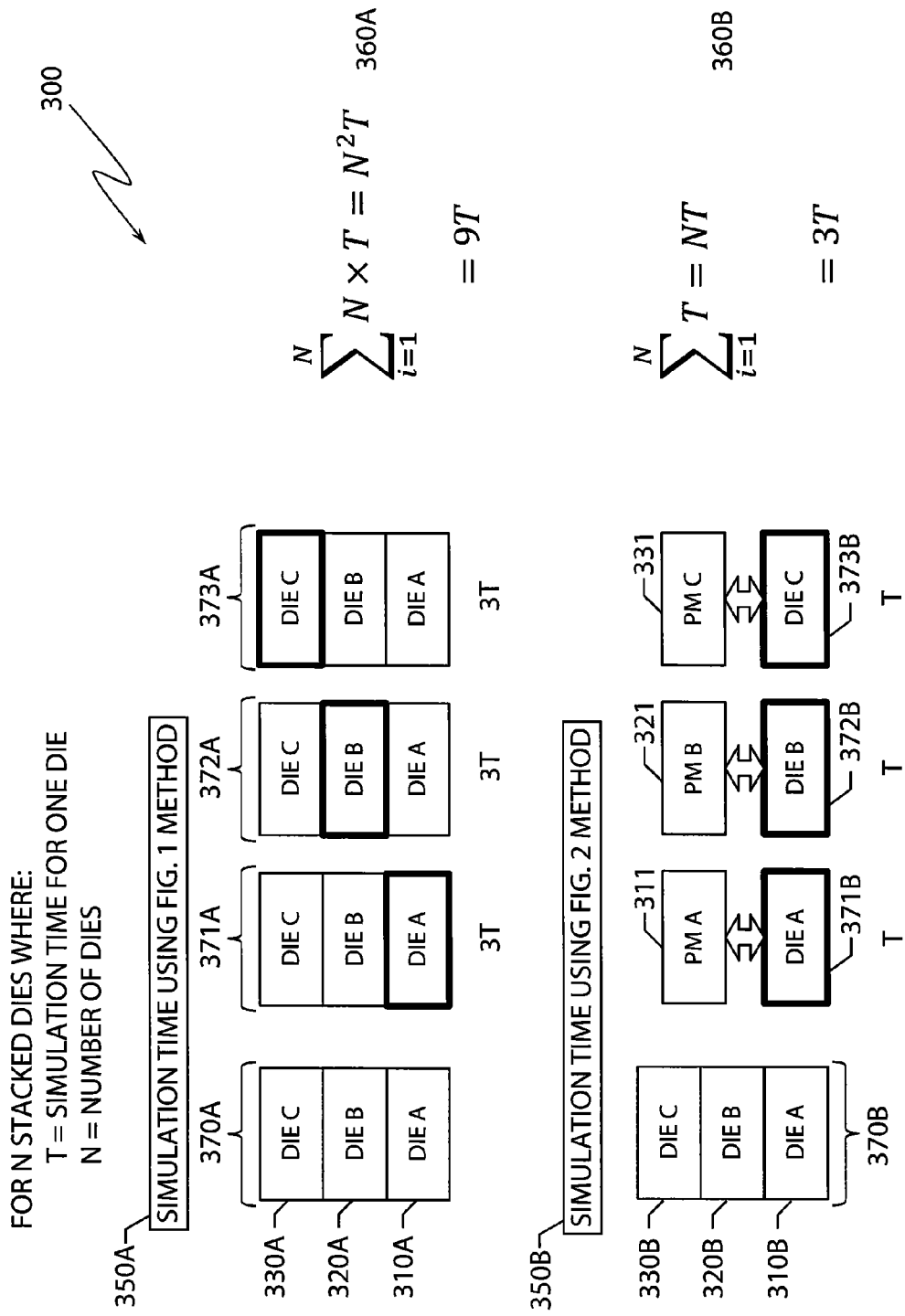
FIG. 3 is a simplified conceptual diagram of the 3D IC verification methodologies shown in FIGS. 1 and 2, indicating a comparison of the simulation time for the verification methodologies of FIG. 1 and FIG. 2.

Directing attention now to FIG. 3, a simplified conceptual diagram 300 of the 3D IC verification methodologies shown in FIGS. 1 and 2 is presented, indicating a comparison of the simulation (e.g., verifying functionality test) time for the verification methodologies of FIG. 1 and FIG. 2. For clarity purposes, not all of the details of the testing systems are shown (e.g., the test bench).

For the simulation time 350A using a method similar to that shown in FIG. 1, a stack of dies 370A is shown which includes three dies, Die A 310A, Die B 320A, and Die C 330A. A test of Die A is shown in the die stack 371A. Since each of the dies in the die stack 371A are interconnected, in order to test one of the dies, all the dies in the stack are simultaneously operated. Thus, the time to complete the test of Die A is 3T where T is the simulation time for one die. Similarly, a test of Die B is shown in the die stack 372A where again the time to complete the test of Die B is 3T. Correspondingly, a test of Die C is shown in the die stack 373A where again the time to complete the test of Die C is 3T. The time to complete the testing for the dies in a stack of dies using the 350A methodology can be generally represented as equation 360A where N is the number of dies in the stack. As can be seen from equation 360A, the time to complete the testing for the die stack using the 350A methodology is a second order function of the number of dies in the die stack, N. For the die stack 370A having three dies, equation 360A results in a value of 9T as the total simulation time for die stack 370A.

For the simulation time 350B using a method similar to that shown in FIG. 2, a stack of dies 370B is shown which includes three dies, Die A 310B, Die B 320B, and Die C 330B. A test of Die A is shown in 371B where Die A is connected to peripheral model A 311 and where other details of the testing system are not shown for clarity purposes. As discussed above with respect to FIG. 2, in the 371B testing arrangement only Die A is operated. Thus, the time to complete the test of Die A is T. Likewise, in the 372B testing arrangement for testing Die B, which is connected to peripheral model B 312, the time to complete the test of Die B is T. The same goes for testing Die C, which is connected to peripheral model C 331 in the 373B testing arrangement: the time to test Die C is T. Thus, the time to complete the testing for the dies in a stack of dies using the 350B methodology can be generally represented as equation 360B where N is the number of dies in the stack. As can be seen from equation 360B, the time to complete the testing for the die stack using the 350B methodology is a first order function of the number of dies in the die stack, N. For the die stack 370B having three dies, equation 360B results in a value of 3T as the total simulation time for die stack 370B.

Figure 4:
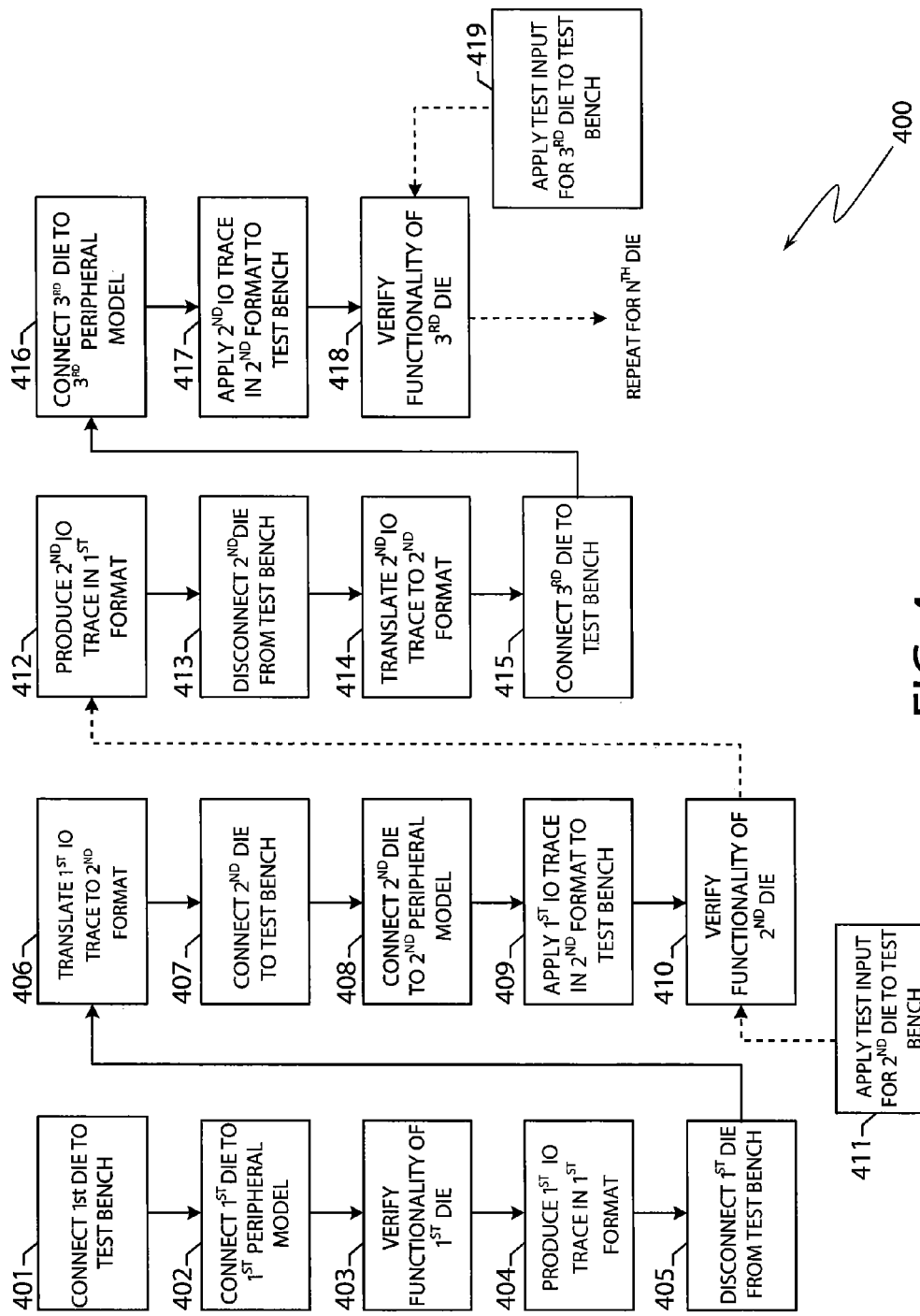
FIG. 4 is a flow diagram of methods for functionally verifying individual chips in a 3D IC stack according to embodiments of the present subject matter.

FIG. 4 is a flow diagram 400 of methods for functionally verifying individual chips in a 3D IC stack according to embodiments of the present subject matter. In an embodiment, at block 401 a first die in a stack of dies is operatively connected to a test bench, as described above. At block 402, the first die is operatively connected to a first peripheral model. At block 403, the functionality of the first die is verified which produces, at block 404, a first I/O trace in a first format, as described above. At block 405, the first die is disconnected from the test bench. At block 406, the first I/O trace in the first format is translated into a first I/O trace in a second format, as described above. At block 407, a second die in the stack of dies is operatively connected to the test bench to which the first die was connected at block 401 and then disconnected at block 405. At block 408, the second die is operatively connected to a second peripheral model. At block 409, the first I/O trace in the second format is applied to the test bench to thereby verify the functionality of the second die at block 410. Alternatively, as discussed above, at block 411 test input for the second die may be applied to the test bench which, along with the first I/O trace in the second format, is used to verify the functionality of the second die at block 410.

In another embodiment, at block 410, as stated above, the functionality of the second die is verified which produces, at block 412, a second I/O trace in a first format, as described above. At block 413, the second die is disconnected from the test bench. At block 414, the second I/O trace in the first format is translated into a second I/O trace in the second format, as described above. At block 415, a third die in the stack of dies is operatively connected to the test bench to which the second die was connected at block 407 and then disconnected at block 413. At block 416, the third die is operatively connected to a third peripheral model. At block 417, the second I/O trace in the second format is applied to the test bench to thereby verify the functionality of the third die at block 418. Alternatively, as discussed above, at block 419 test input for the third die may be applied to the test bench which, along with the second I/O trace in the second format, is used to verify the functionality of the third die at block 410.

In a further embodiment, the verification of the functionality of the third die at block 418 produces a third I/O trace in a first format which can be used in a manner similar to that described above to verify the functionality of an $N^{th}$ die. Thus, the process can be repeated for all N dies in a stack of dies.

Figure 5:
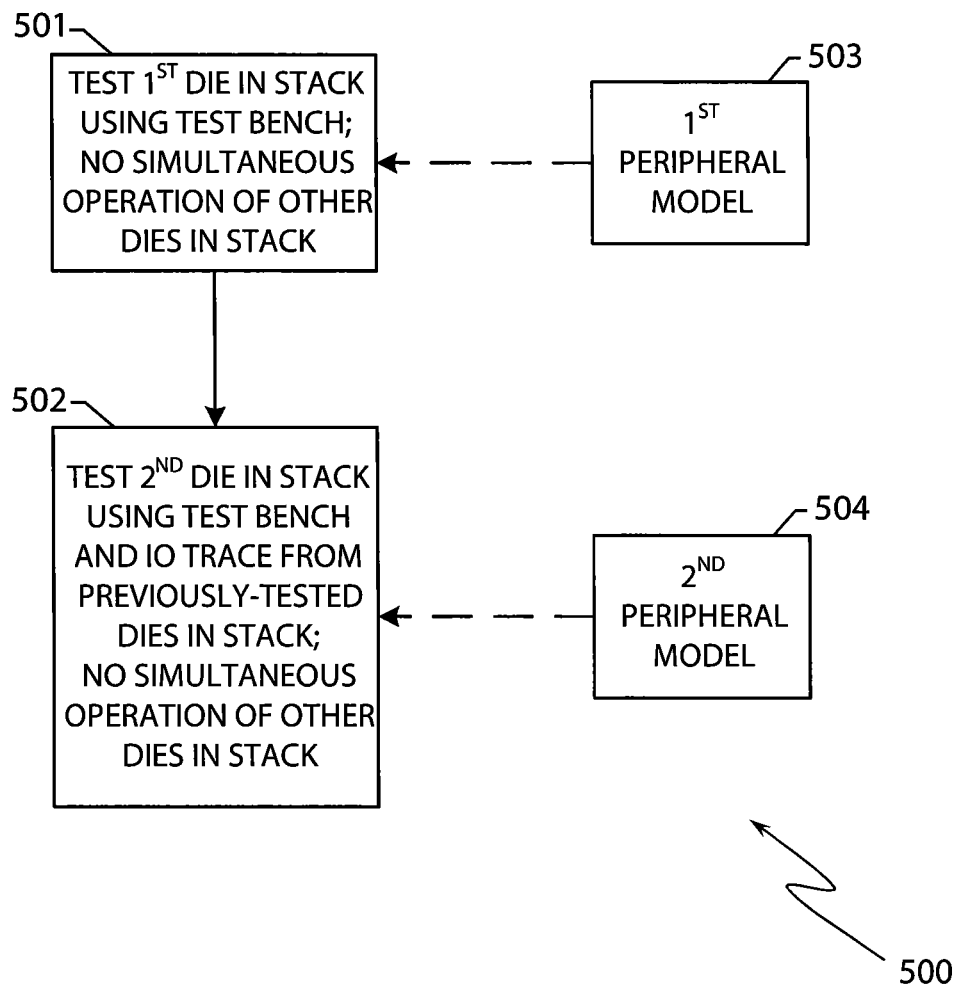
FIG. 5 is a flow diagram of a method for functionally verifying individual chips in a 3D IC stack according to an embodiment of the present subject matter.

With reference now to FIG. 5, a flow diagram of a method 500 for functionally verifying individual chips in a 3D IC stack according to an embodiment of the present subject matter is presented. At block 501, a first die in a stack of dies is tested (e.g., verifying the functionality of the die) using a test bench where none of the other dies in the stack of dies are simultaneously operated during the testing of the first die. At block 503, a first peripheral model is operatively connected to the first die during the testing of the first die. At block 502, a second die in the stack of dies is tested using the test bench and an I/O trace produced at least in part from testing of all previously-tested dies in the stack where none of the other dies in the stack of dies are simultaneously operated during the testing of the second die. At block 504, a second peripheral model is operatively connected to the second die during the testing of the second die.

Figure 6:
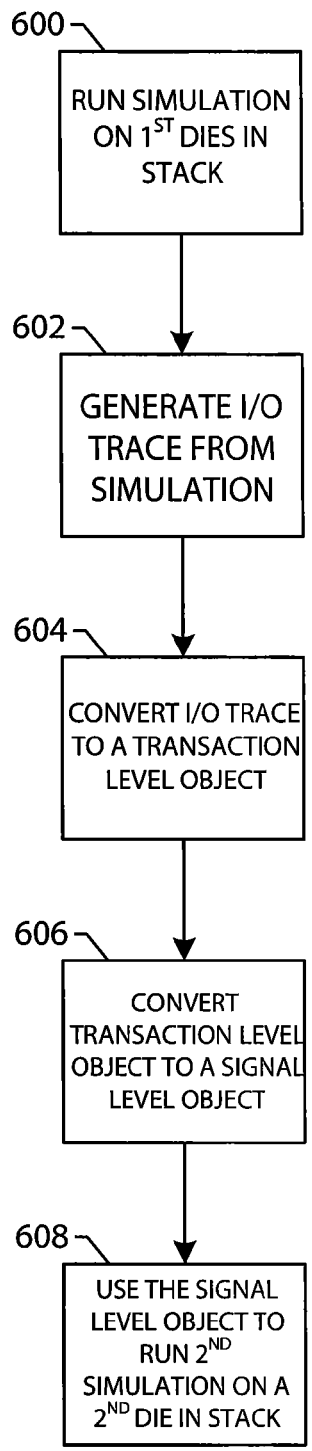
FIG. 6 is a flow diagram demonstrating a high level conversion from an I/O trace to a transaction level format.

With reference now to FIGS. 6-10, a means for implementing VCD to UVM converter 202B and 202C will be discussed. FIG. 6 provides a general description of the conversion process. At step 600, a simulation is run on a first die in a stack. This simulation may be, for example, the functional verification steps 403, 410, and 417 discussed above. At step 602, an I/O trace is captured from the simulation of the first die. This I/O trace may be the same I/O trace as 203B, 203C, 404 or 412. Next, at block 604, the I/O trace is converted to a transaction level object. This transaction level object may be embodied as the second format disclosed in FIG. 4, steps 406, 409, 414, and 417. In an embodiment, the second format is one or more UVM transactions, sequences, tests, or any combination, derivation, or extension thereof. At step 606, the transaction level object is converted back to a signal level object and is used to drive a second simulation on a second die in the stack at step 608.

Figure 7:
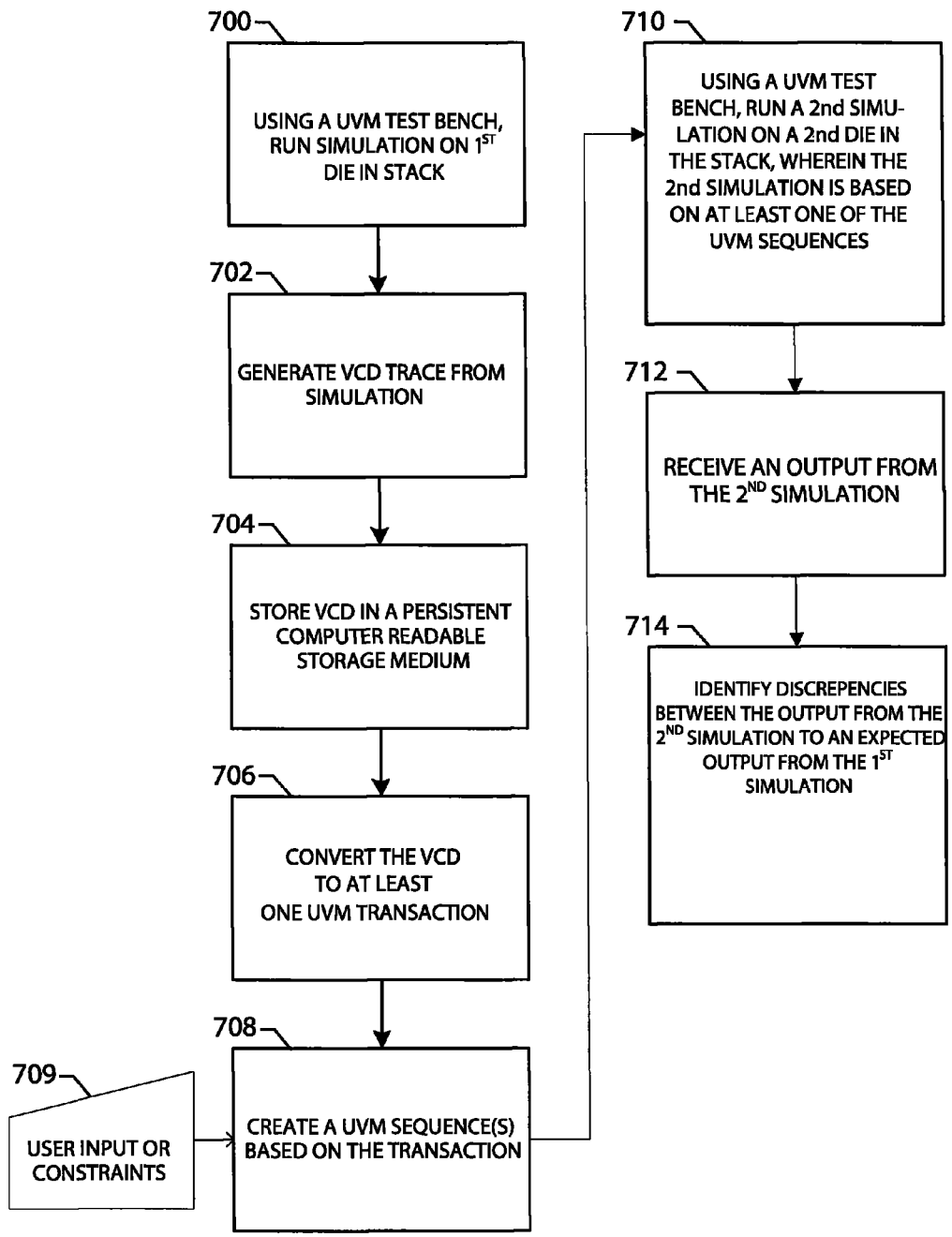
FIG. 7 is a flow diagram demonstrating a detailed method for converting a Value Change Dump ("VCD") to a Universal Verification Methodology ("UVM") transaction for the purposes of testing one or more die in a stack.

Turning now to FIG. 7, a detailed process for testing a stack of dies using VCD to UVM conversion is discussed. At step 700, a first simulation is run on a first die in a stack. This first simulation may be, for example, run using a UVM test bench and peripheral model, as discussed above.

At step 702, a VCD trace is generated by the first simulation. This VCD trace may detail all of the I/O operations occurring during the first simulation. This information may include, but is not limited to, the type of operation (e.g. read or write), the time the operation occurs, the peripheral device port used to complete the operation, an address where the operation is performed, and the data which is being manipulated by the operation. Alternatively, the VCD trace may only capture limited details about the I/O operations. For example, the generated trace may only contain information relating to read operations. Similarly, the trace may be limited to operations using a specific address or port.

At step 704, the VCD trace may optionally be stored in a persistent computer readable storage medium, such as a computer database. The stored trace may then be used for future analytics, or used to create and run functional verification tests and/or simulations. One advantage of storing the trace is that the trace may be reused in the future without rerunning the first simulation. Thus, once a first die in the stack has been successfully simulated and tested, simulation and/or tests of the second die in the stack may use the captured VCD trace. The simulations and tests on the second die may be completed without re-simulating the first die.

At 706, the VCD trace may be converted to one or more UVM transaction objects. The UVM transaction objects may contain substantially the same information as the VCD stack trace. For example, the transaction object may contain information on the operation type, port, address, and time of a captured I/O operation. Embodying this information in a transaction level object may allow a user to quickly test and debug the design and/or layout of the die under test. Additionally, the transaction level object may promote quick simulation and enable the engineer to consider design alternatives.

The VCD to UVM transaction conversion may be facilitated through any high level programming language, such as C, C++, Java, or the like. Converting the trace to a transaction level object may provide easier user manipulation. For example, the user may manipulate the object using high level, user readable code, rather than signal level "highs" and "lows." Tests and corrections may be quickly written in few lines of code, rather than in an unmanageable string of 1's, 0's, H's or L's. Additionally, when the simulation produces a result indicating design and/or layout errors, the issue may be more easily and readily identified. Viewing a signal level output, in contrast, may involve the user locating a single bit, within gigabytes of data, that is flipped in the wrong direction.

One embodiment uses a UVM simulation log to aid in debugging a design of a die. Once the VCD has been converted to a UVM transaction, software may be leveraged to generate a user readable description of the operations. The user readable description may be used to quickly identify erroneous results, and to locate bugs in the die being tested.

At step 708, one or more UVM sequence objects are generated from the UVM transaction. These sequence objects may embody one or more set of operations captured by the VCD, and, at step 710, are passed to a second die in a stack to run a second simulation. In an embodiment, the sequences may be directed, meaning they are passed to the second die in a substantially unaltered state from the VCD trace.

In one embodiment, the sequences may be constrained or modified by user input 709. Constrained sequences allow the user to customize the operations performed on the second die in the stack. For example, a user may specify that the operations are only to be performed between certain addresses. Alternatively or additionally, the constraint could force all of the operations to use the same peripheral device port, or alter the data contained in the operation. These constraints may be used for a variety of purposes, such as stress testing or debugging. In one embodiment, the constraints are written using a high level programming language, such as C++. The constraints may be entered directly into the code that creates the sequences, or may be retrieved from an external source, such as a properties file.

Alternatively or additionally, in some embodiments, the sequences are randomized. Randomized sequences may be generated by a computer and contain properties that are random or unpredictable. For example, the computer may arbitrarily designate addresses or operations. The randomized sequences may also contain randomized data or peripheral ports. Random sequences may be particularly helpful in stress testing and debugging because they can execute unpredictable operations.

In other embodiments, randomized sequences may be constrained to produce constrained random sequences. Constrained random sequences are an arbitrary set of operations selected by a computer from the set of UVM sequences. They may impose a set of random, computer generated constraints on one or more sequences. Random constrained sequences may be useful in stress testing and debugging. At step 710, a UVM test bench is used to run a second simulation on a second die in the stack. This second simulation may use the same test bench as the original simulation.

At step 712 an output is received from the second simulation. This output may be a new VCD trace which may be used to continue simulation on the next die in the stack, thereby repeating the process for die N+1.

In one embodiment, an expected output is generated to be compared to the actual output from step 712. At step 714, the actual output and the expected output are compared and discrepancies are identified. If a discrepancy is found, it may indicate a bug in one or more of the dies that have been tested. This discrepancy may then be used to identify and fix that bug. The expected results may be derived from the original VCD trace, or from the UVM sequences passed to the die under test.

In an embodiment, the expected results are comprised of read data. A first die in the stack may issue a READ command to a peripheral model, such as models 211, 221, or 231, which returns read data in response. This returned data may then be stored as an expected result. If a second die issues the same read command to the peripheral model, the returned data can be compared to the stored data. A mismatch between the read data and the expected data may indicate a bug in the system.

Figure 8:
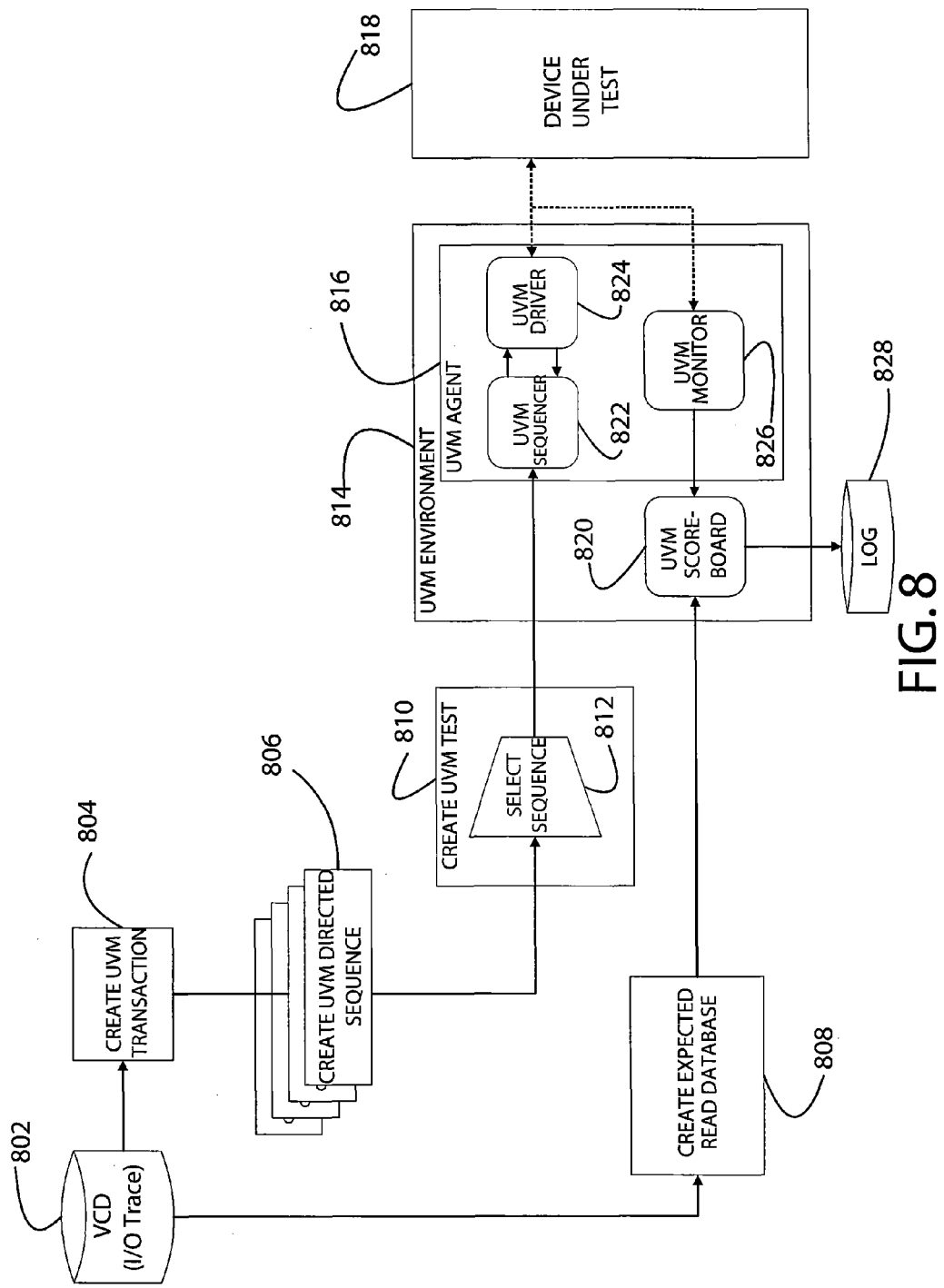
FIG. 8 is a block diagram of a UVM model which tests a die in the stack based on a set of directed UVM sequences.

FIG. 8 is a block diagram of a conversion system used to process directed sequences. Block 802 indicates a VCD trace captured from a prior simulation or functional test. Alternatively, a VCD trace embodying a hypothetical simulation may be artificially generated by a user or computer.

At block 804, one or more UVM transactions are created. The UVM transaction is then used to create at least one directed sequence at block 806. As discussed above, the conversion and creation may be achieved using a high level programming language and a set of UVM libraries.

At block 810, UVM tests are created by selecting, at 812, individual sequences to be passed to the die under test, 818. Sequences may be selected based on a variety of criteria. For example, the selector 812 may choose all the sequences that are read operations, followed by all the sequences that a write operations. Alternatively or additionally, only sequences operating over a specific port or at a specific address may be selected. Any other type of selection criteria may be used to select a sequence to be processed.

The UVM sequences are next received by UVM environment 814. The UVM environment may comply with IEEE UVM standards, and is comprised of a UVM Scoreboard 820 and a UVM Agent 816. In an embodiment, the environment complies with UVM version 1.1a released on Dec. 12, 2011. The sequence selected in block 812 is received by UVM sequencer 822, which operates inside the UVM agent 816. Sequencer 822 manages the sequences, and receives them one at a time before passing them to UVM driver 824. Driver 824 converts the sequences from the transaction level to the signal level, and submits them to the device under test 818. While the UVM Environment may comply with IEEE standards, and therefore be reused for different simulations on different devices, driver 824 may be device specific. For each individual device tested, driver 824 may be modified or replaced.

Prior to, or during, simulation, device under test 818 submits output back to the UVM Agent 816. This output may be captured by UVM Monitor 826, which forwards the output to UVM Scoreboard 820. Alternatively or additionally, a new VCD trace may be generated from the output and used for future simulations. The UVM scoreboard may compare the output of the device under test to the expected output, generated at block 808 from the VCD 802. The results of the comparison may be stored in log 828, which can be used to identify software errors as discussed above.

Figure 9:
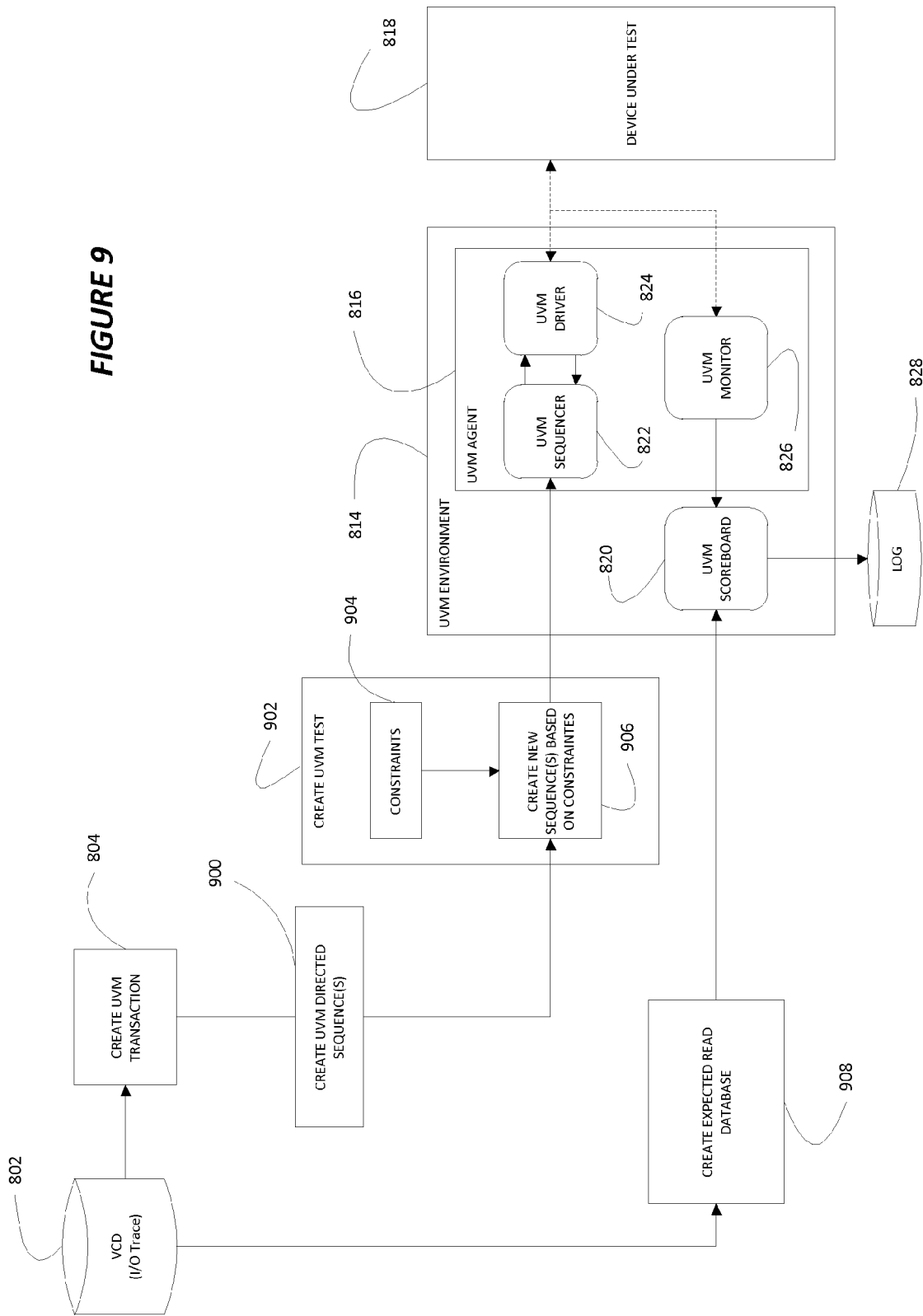
FIG. 9 is a block diagram of a UVM model which tests a die in a stack based on a set of constrained UVM sequences.

FIG. 9 is a similar environment as discussed in FIG. 8, but is used to process constrained, rather than directed, sequences. At step 900, a set of directed sequences are created from the UVM transaction and passed to the UVM Test creation block 902. At step 906, these sequences receive, and are modified by, constraints 904. The constraints may be a set of user inputted or computer generated values. The new sequences are then passed to the UVM environment, which operates in substantially the same way as in FIG. 8.

At block 908, an expected output is generated from the constrained sequences. This output may be passed to the UVM Scoreboard to identify any discrepancies in the actual output. Unlike the output generated in block 808 of FIG. 8, block 908 is created directly from the sequences. This may be beneficial when the constraints modify the sequences to such an extent that the VCD cannot reliably predict an expected result. Once the output is generated, and optionally stored in a non-transient computer readable storage medium, such as a database, the comparison continues as it would in FIG. 8.

Figure 10:
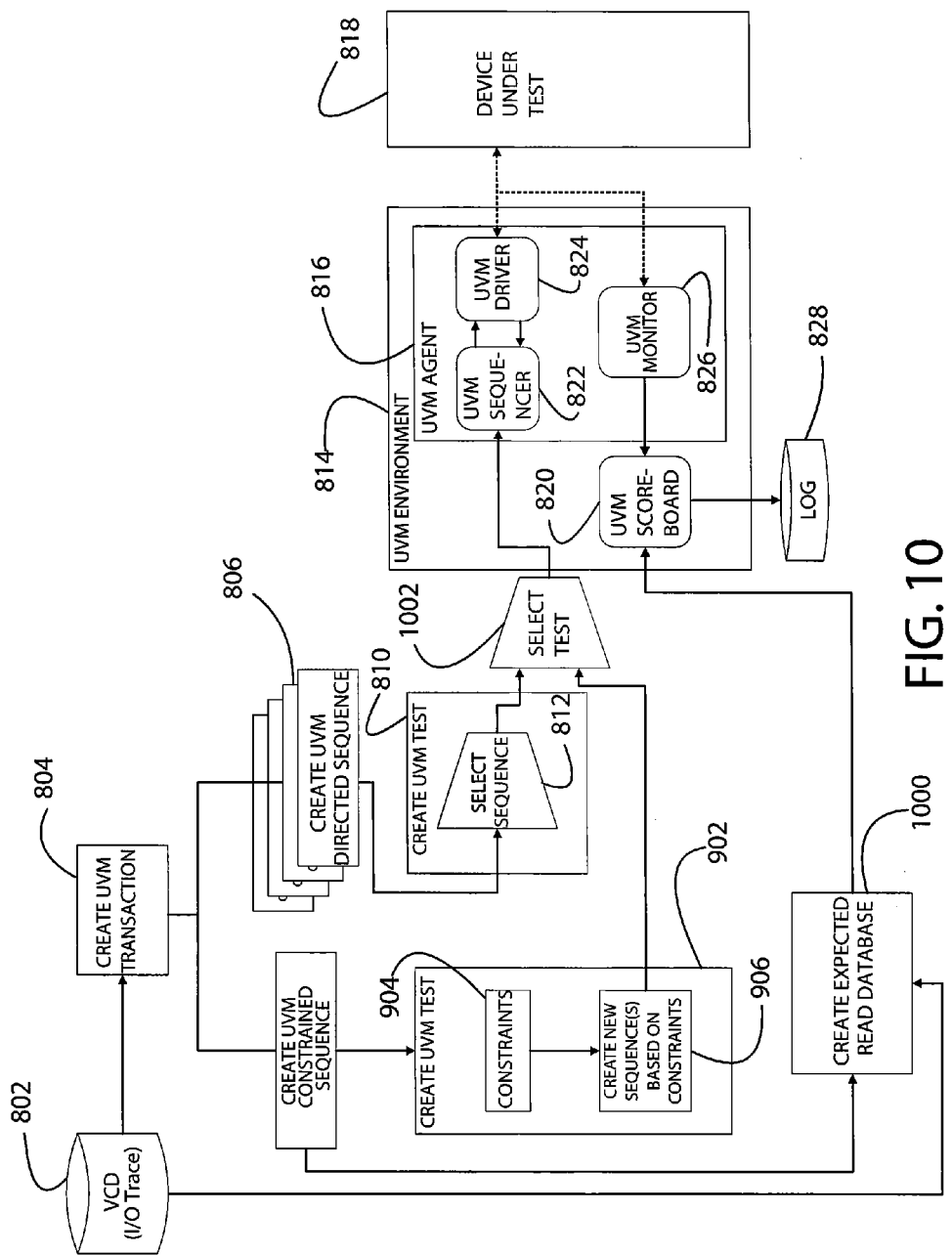
FIG. 10 is a block diagram of a UVM model which tests a die in a stack based on both directed and constrained UVM sequences.

FIG. 10 is an environment configured to manage both directed and constrained sequences. The creation, execution, and management of the transaction and sequences is substantially similar to FIGS. 8 and 9. The expected output, and its optional corresponding database, may be generated from a combination of the VCD and constrained sequences at block 1000. At block 1002, a determination is made about which sequence to submit to the UVM environment. This determination may be arbitrary, or may be based on a set of user preferences. For example, all the directed sequences may be processed, followed by the constrained sequences, or vice versa. Alternatively, the sequences may be alternated. Any other order of sequence submission may be used.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, when the computer program code is loaded into and executed by a computer, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the system and method have been described in terms of exemplary embodiments, they are not limited thereto. Rather, the appended claims should be construed broadly, to include other variants and embodiments, which may be made by those skilled in the art without departing from the scope and range of equivalents of the disclosure.

What is claimed is:

1. A method for verifying a functionality of ones of a plurality of dies to be arranged in a stack of dies, the method comprising:
    simulating operation of a first one of the plurality of dies in the stack in a first single-die simulation using a processor;
    generating an input/output ("I/O") trace from the simulation of the first die;
    converting the I/O trace to at least one Universal Verification Methodology ("UVM") transaction level object;
    converting the at least one UVM transaction level object to a signal level object, and
    simulating a second one of the plurality of dies in a second single-die simulation using the signal level object.

2. The method of claim 1, wherein the I/O trace is a Value Change Dump ("VCD").

3. The method of claim 1, further comprising generating at least one UVM Sequence from the UVM Transaction.

4. The method of claim 3, wherein the second simulation is based on at least one UVM Sequence.

5. The method of claim 3, wherein at least one UVM Sequence is a directed sequence.

6. The method of claim 3, wherein at least one UVM Sequence is modified by a user input.

7. The method of claim 3, wherein at least one UVM Sequence is a constrained sequence.

8. The method of claim 3, wherein at least one UVM Sequence is a directed sequence and at least one other UVM Sequence is a constrained sequence.

9. The method of claim 3, wherein at least one UVM Sequence is a random sequence.

10. The method of claim 1, further comprising the steps of:
    generating an expected output from the I/O trace, where the expected output is not based on a simulation;
    receiving a second simulation output from simulating the second die; and
    identifying discrepancies between the expected output and the second simulation output.

11. The method of claim 1, wherein each transaction level object includes at least one of an address, a data field, a port, and an operation.

12. The method of claim 11, wherein the operation is a selected one of a read operation and a write operation.

13. The method of claim 1, further comprising storing the I/O trace in a persistent, computer readable storage medium prior to converting the I/O trace to the at least one transaction level object.

14. A non-transient machine readable storage medium encoded with program code, wherein when the program code is executed by a processor, the processor performs a method for verifying a functionality of ones of a plurality of dies to be arranged in a stack of dies, the method comprising:
    simulating operation of a first one of the plurality of dies in the stack in a first single-die simulation;
    generating an input/output ("I/O") trace from the simulation run on the first die;
    converting the I/O trace to at least one Universal Verification Methodology ("UVM") transaction level object;
    converting the at least one UVM transaction level object to a signal level object, and
    running a second single-die simulation on a second one of the plurality of dies using the signal level object.

15. The non-transient machine readable storage medium of claim 14, wherein the I/O trace is a Value Change Dump ("VCD").

16. A system for verifying a functionality of ones of a plurality of dies to be arranged in a stack of dies, comprising:
    a memory device in communication with a processor, wherein the processor is configured to:
        simulate operation of a first one of the plurality of dies in the stack in a first single-die simulation;
        store an input/output ("I/O") trace associated with the first single-die simulation in the memory device;
        establish a Universal Verification Methodology ("UVM") environment for testing a second die in the plurality of dies;
        convert the I/O trace to at least one UVM Transaction;
        run a second single die simulation of the second die in the stack using inputs based on the at least one UVM Transaction.

17. The system of claim 16, wherein the UVM environment comprises a UVM agent configured to process the second simulation.

18. The system of claim 17, wherein the UVM agent comprises a device driver and an output monitor, wherein the device driver is configured to drive the simulation of the second die and the output monitor is configured to monitor the simulation output.

19. The system of claim 16, wherein the UVM environment comprises a comparator, wherein the comparator is configured to:
    compare an actual result from the second simulation with an expected result, wherein the expected result is generated from the I/O trace;
    identify discrepancies between the actual result and the expected result; and
    store the discrepancies in a log.

* * * * *